United States Patent
Salter et al.

(10) Patent No.: US 9,688,192 B2
(45) Date of Patent: Jun. 27, 2017

(54) VEHICLE HAVING INTERIOR AND EXTERIOR LIGHTING ON TAILGATE

(71) Applicant: Ford Global Technologies, LLC, Dearborn, MI (US)

(72) Inventors: Stuart C. Salter, White Lake, MI (US); Cornel Lewis Gardner, Romulus, MI (US); Annette Lynn Huebner, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 14/855,479

(22) Filed: Sep. 16, 2015

(65) Prior Publication Data
US 2016/0001700 A1 Jan. 7, 2016

Related U.S. Application Data

(63) Continuation-in-part of application No. 14/603,636, filed on Jan. 23, 2015, now Pat. No. 9,573,517, which
(Continued)

(51) Int. Cl.
| | |
|---|---|
| *B60Q 1/00* | (2006.01) |
| *B60Q 1/26* | (2006.01) |
| *B60Q 11/00* | (2006.01) |
| *B60Q 3/06* | (2006.01) |
| *B60Q 1/56* | (2006.01) |

(Continued)

(52) U.S. Cl.
CPC ............... *B60Q 3/06* (2013.01); *B60Q 1/24* (2013.01); *B60Q 1/56* (2013.01); *B60Q 3/30* (2017.02); *B60Q 3/68* (2017.02); *F21S 48/215* (2013.01); *F21S 48/217* (2013.01); *F21S 48/2212* (2013.01); *H05B 37/0218* (2013.01); *H05B 37/0227* (2013.01); *Y02B 20/46* (2013.01)

(58) Field of Classification Search
CPC . B60Q 1/24; B60Q 1/245; B60Q 1/56; B60Q 3/00; B60Q 3/30; B60Q 3/68; F21S 48/215; F21S 48/217; F21S 48/218; F21S 48/2212; H05B 37/0218; H05B 37/0227
USPC .................................................. 362/496–499
See application file for complete search history.

(56) References Cited

U.S. PATENT DOCUMENTS

| | | | | |
|---|---|---|---|---|
| 4,851,970 | A | * | 7/1989 | Bronder ................. B60Q 1/302 |
| | | | | 362/269 |
| 5,053,930 | A | | 10/1991 | Benavides |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP

(57) ABSTRACT

A vehicle is provided that includes a cabin defining a cargo space, and a tailgate operable between a substantially open position and a substantially closed position. The tailgate defines a license plate area on an exterior surface thereof. An illumination system is positioned within the tailgate, such that the illumination system illuminates at least one of the cargo space and the license plate area when the tailgate is in the closed position and illuminates a ground area behind the vehicle when the tailgate is in the open position.

15 Claims, 13 Drawing Sheets

Related U.S. Application Data is a continuation-in-part of application No. 14/086,442, filed on Nov. 21, 2013.

(51) Int. Cl.
*H05B 37/02* (2006.01)
*B60Q 1/24* (2006.01)
*F21S 8/10* (2006.01)
*B60Q 3/68* (2017.01)
*B60Q 3/30* (2017.01)

(56) References Cited

U.S. PATENT DOCUMENTS

| | | |
|---|---|---|
| 5,709,453 A | 1/1998 | Krent et al. |
| 5,839,718 A | 11/1998 | Hase et al. |
| 6,031,511 A | 2/2000 | DeLuca et al. |
| 6,086,230 A * | 7/2000 | Wooldridge ............ B60Q 3/30 340/479 |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0236613 A1 | 8/2016 | Trier |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |

\* cited by examiner

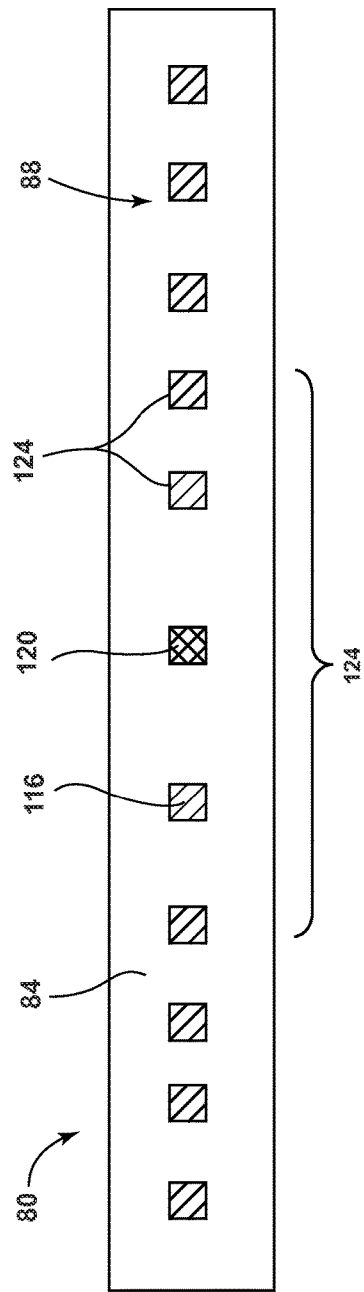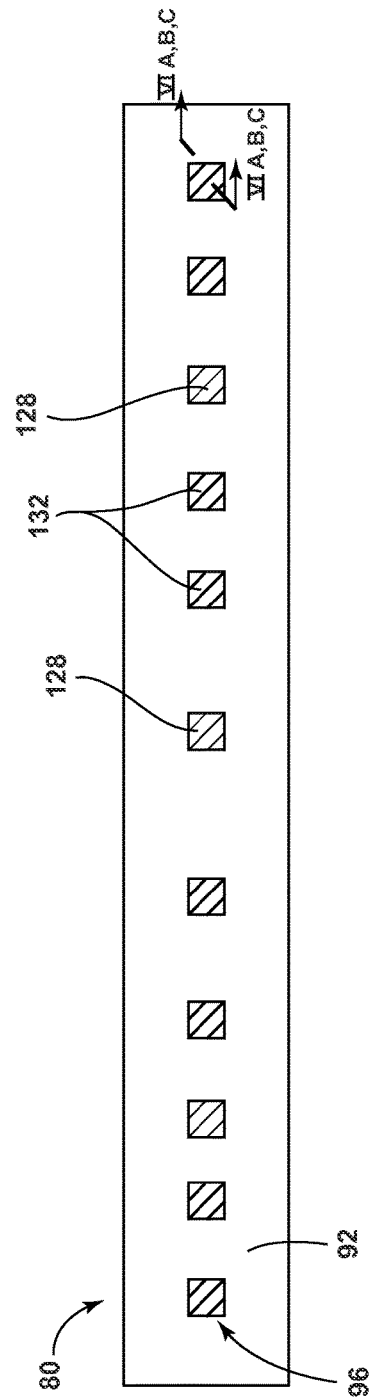
FIG. 5A
FIG. 5B

VEHICLE HAVING INTERIOR AND EXTERIOR LIGHTING ON TAILGATE

CROSS-REFERENCE TO RELATED APPLICATIONS

This application is a continuation-in-part of U.S. patent application Ser. No. 14/603,636, filed on Jan. 23, 2015, entitled "DOOR ILLUMINATION AND WARNING SYSTEM," which is a continuation-in-part of U.S. patent application Ser. No. 14/086,442, filed on Nov. 21, 2013, entitled "VEHICLE LIGHTING SYSTEM WITH PHOTOLUMINESCENT STRUCTURE. The aforementioned related applications are hereby incorporated by reference in their entirety.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from photoluminescent materials offers a unique and attractive viewing experience. It is therefore desired to incorporate such photoluminescent materials in portions of vehicles to provide accent lighting.

SUMMARY OF THE INVENTION

According to one aspect of the present disclosure, a vehicle is provided that includes a cabin defining a cargo space, and a tailgate operable between a substantially open position and a substantially closed position. The tailgate defines a license plate area on an exterior surface thereof. An illumination system is positioned within the tailgate, such that the illumination system illuminates the cargo space and the license plate area when the tailgate is in the closed position and illuminates a ground area behind the vehicle when the tailgate is in the open position.

According to another aspect of the present disclosure, a vehicle is provided that includes a vehicle cabin defining a cargo space and a tailgate pivotally coupled with a roof of the vehicle. The tailgate defines an exterior surface and an interior surface and an illumination system that includes at least one light source. The illumination system is disposed through the tailgate and configured to emit light from both the exterior surface and the interior surface of the tailgate.

According to yet another aspect of the present disclosure, a vehicle is provided that includes a vehicle cabin defining a cargo space and a tailgate pivotally coupled with a roof of the vehicle. The tailgate defines an exterior surface and an interior surface. A plurality of proximity sensors are positioned proximate the tailgate and an illumination system is positioned within the tailgate. The illumination system is configured to switch between different illumination modes based at least in part on a signal from the proximity sensors.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 5A is a front plan view of a printed circuit board illustrating a light source arrangement, according to one embodiment;

FIG. 5B is a back plan view of a printed circuit board illustrating a light source arrangement, according to one embodiment;

DETAILED DESCRIPTION OF THE PREFERRED EMBODIMENTS

Figure 1:
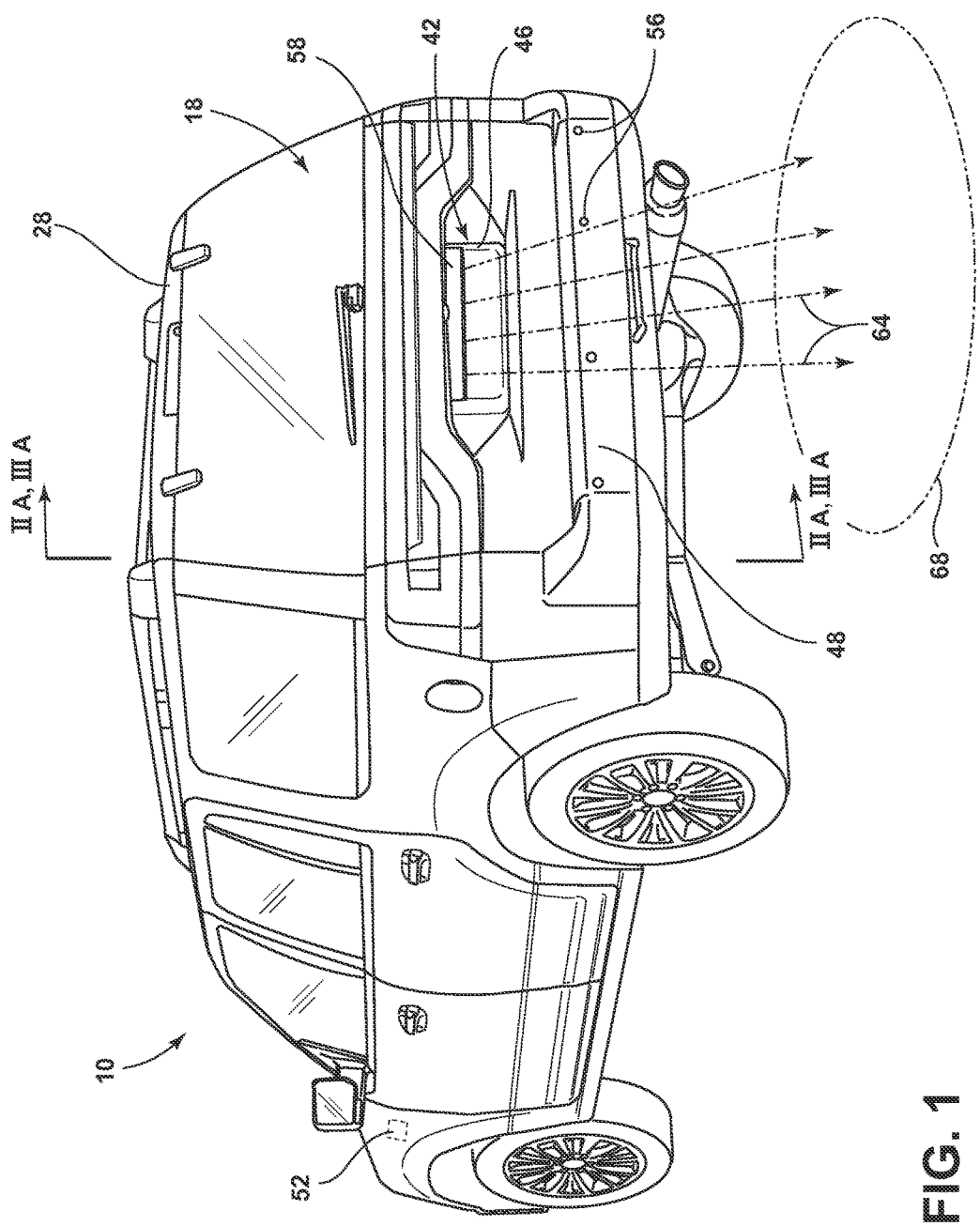
FIG. 1 illustrates a rear perspective view of a vehicle according to one embodiment.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-3A, depicted is a vehicle 10 in the form of a sport utility vehicle having a cabin 14 and a tailgate 18. The vehicle 10 defines a cargo space 22 within the cabin 14 positioned between a rear passenger seat 26 and the tailgate 18. It will be understood that in various embodiments the seat 26 may be folded or otherwise stored in a floor 30 of the cabin 14 or folded forward to increase a volume of the cargo space 22. Pivotally coupled to a rear portion of the vehicle 10 is the tailgate 18. In the depicted embodiment, the tailgate 18 is pivotally coupled to a roof 28 of the vehicle 10, but may also be pivotally coupled to a bottom or side of the vehicle 10. The tailgate 18 is operable to pivot between substantially closed (FIGS. 1 and 2A) and substantially open (FIG. 3A) positions. Opening of the tailgate 18 to the open position permits access to the cargo space 22 and cabin 14 of the vehicle 10. Positioned proximate the tailgate 18 is a tailgate sensor 32 configured to sense or determine if the tailgate 18 is ajar from the closed position or in the open position. The tailgate 18 defines both an exterior surface 34 and an interior surface 38. Defined on the exterior surface 34 of the tailgate 18 is a license plate area 42. A license plate 46 may be mounted to the license plate area 42 and illuminated in order to comply with local, state, and federal transportation laws. A bumper 48 is positioned below the tailgate 18. In the depicted embodiment, a trailer hitch receiver 50 is coupled with a trailer hitch 54 and is positioned under the license plate area 42 of the tailgate 18 and may be utilized in towing a trailer or other towed equipment. Additionally, one or more proximity sensors 56 (e.g., ultrasonic, radar, and/or visual) may be positioned on the bumper 48 or proximate the tailgate 18 for sensing objects or people behind and/or on the sides of the vehicle 10. Further, a light sensor 52 may be disposed within the vehicle 10. The light sensor 52 may be able to discern the time of the day based on a reading of the surrounding lighting conditions (e.g., light, dark, or twilight). The light sensor 52 may then output a signal which may be used by the vehicle 10.

Referring now to the embodiments depicted in FIGS. 2A-3B, positioned within and disposed through the tailgate 18 is an illumination system 58. The illumination system 58 is configured to emit light both into the interior of the cabin 14 of the vehicle 10 and the exterior of the vehicle 10.

Figure 2A:
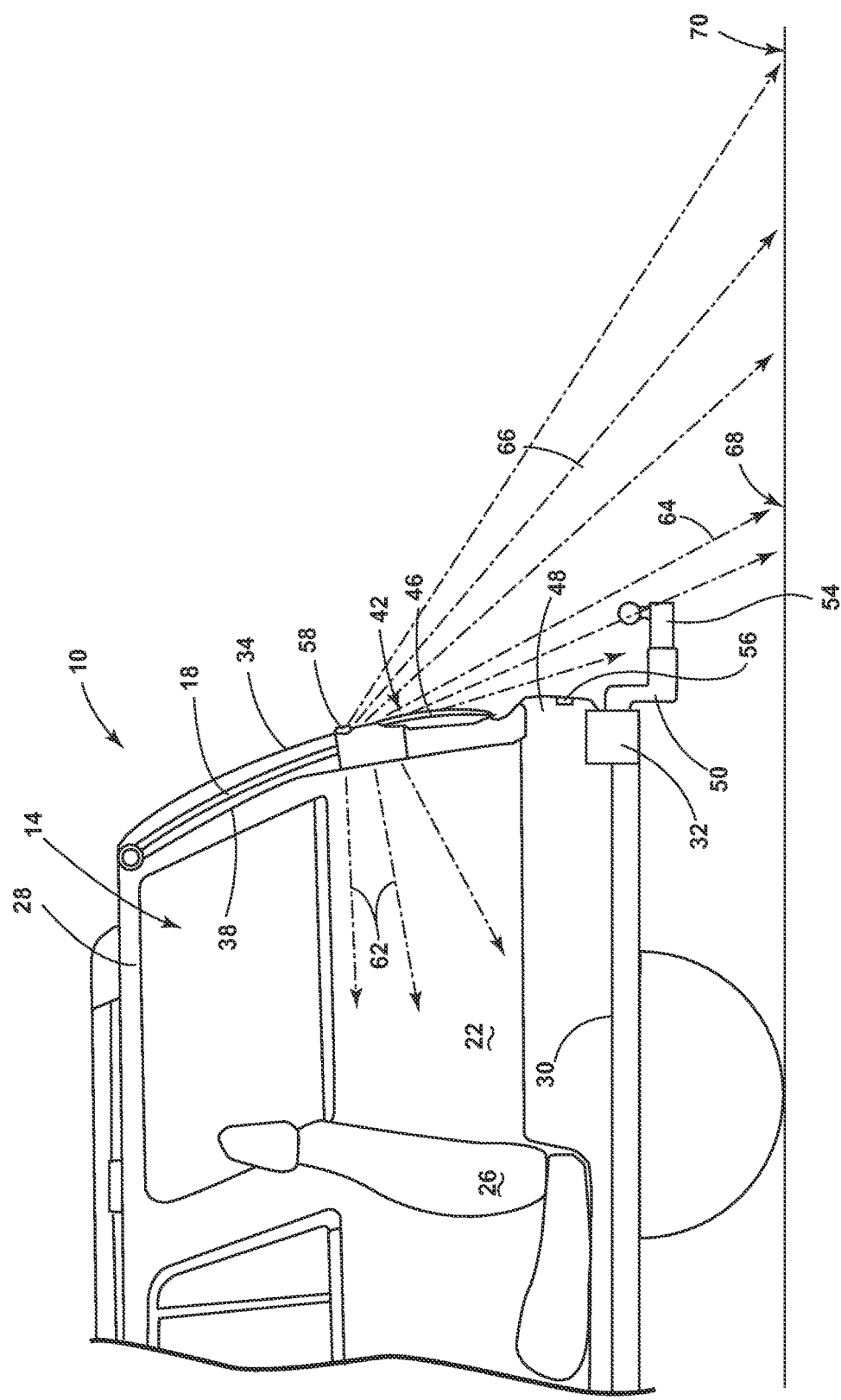
FIG. 2A is a cross-sectional view taken along line IIA of FIG. 1, according to one embodiment.
Figure 2B:
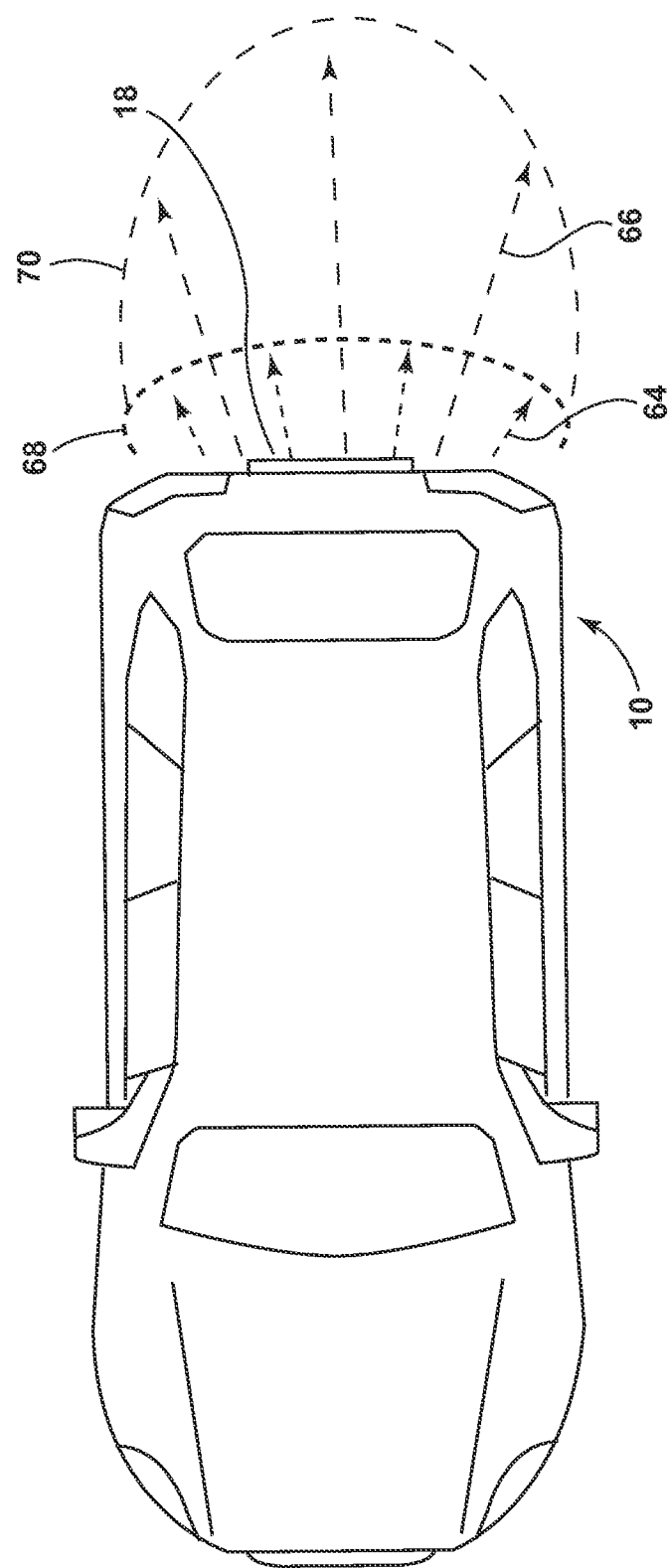
FIG. 2B is a top plan view of the vehicle emitting light, according to one embodiment.

Referring now to FIGS. 2A and 2B, in the closed position of the tailgate 18, the illumination system 58 may emit light in both a vehicle forward direction and a vehicle rearward direction. Light emitted in the vehicle forward direction may be cargo light 62 emitted from the interior surface 38 side of the illumination system 58. The cargo light 62 is configured to enter and illuminate the cargo space 22. Such illumination may be advantageous in aiding an occupant of the vehicle 10 in finding or placing items within the cargo space 22 (e.g., task lighting). Additionally, illumination within the cargo space 22 may provide aesthetically pleasing ambient lighting, as well as aid in overall illumination of the cabin 14.

The illumination system 58, when the tailgate 18 is in the closed position, may also emit light exterior to the vehicle 10. It will be understood that the illumination system 58 may emit interior cargo light 62 and the exterior light independently or at the same time. The illumination system 58 may be operated in a plurality of illumination modes, either separately or at the same time. In the closed position of the tailgate 18, the illumination system 58 may operate in a ground illumination mode in which the illumination system 58 may emit ground illumination light 64 and a picnic lighting mode in which picnic light 66 is emitted. In the ground illumination mode, the illumination system 58 may direct the ground illumination light 64 in a downward direction from the illumination system 58 to illuminate the bumper 48, license plate 46, the license plate area 42, the trailer hitch 54 and/or the ground behind and below the vehicle 10. During the ground illumination mode of the illumination system 58, the ground illumination light 64 may provide illumination to the license plate area 42 and/or function as a puddle lamp or hitch lighting behind the vehicle 10 to provide illumination to ground hazards (e.g., uneven terrain, water, and/or holes) and/or general task lighting near the ground. The ground illumination light 64 may illuminate a first area 68 of the ground which extends from below the vehicle 10 to about 1 meter, to about 2 meters, to about 3 meters, or to about 4 meters from the bumper 48 and/or the tailgate 18. It should be understood that the ground illumination light 64 may vary in intensity (e.g., between about 10% and about 100% intensity) or duration (e.g., between about 0.5 seconds and indefinitely) based on predetermined parameters or programs of the ground illumination mode.

The illumination system 58 may also be operated in an area lighting mode configured to illuminate a space behind, and some distance from, the vehicle 10. The area lighting mode will be referred to as the picnic lighting mode and is configured to provide long distance picnic light 66 behind and to the sides of the vehicle 10 to illuminate a second area 70 of the ground. During operation of the picnic lighting mode, the illumination system 58 may be configured to project the picnic light 66 between about 1 meter and about 8 meters from the bumper 48, or between about 2 meters to about 7 meters from the bumper 48 of the vehicle 10. During operation of the picnic lighting mode, the picnic light 66 emitted from the illumination system 58 may be more intense or brighter than during operation of the illumination system 58 in the ground illumination mode. It should be understood that the picnic light 66 may vary in intensity (e.g., between about 10% and about 100% intensity) or duration (e.g., between about 0.5 seconds and indefinitely) based on predetermined parameters or programs of the picnic lighting mode. In various embodiments, the second area 70 may have a different and more oblong-like shape than the first area 68. In various embodiments, the operation of the illumination system 58 between the ground illumination mode and the picnic lighting mode may be controlled based on presence or movement of an object sensed by the one or more proximity sensors 56. For example, if movement (e.g., from an occupant or person) is detected within about 3 meters behind the vehicle 10 (e.g., about the first area 68) for a predetermined period of time (e.g., less than about 30 seconds, less than about 20 seconds, less than about 15 seconds, less than about 10 seconds, or less than about 5 seconds) the ground illumination mode of the illumination system 58 may be activated to illuminate the first area 68. However, if movement is detected between about 3 meters and about 7 meters behind the vehicle 10 (e.g., about the second area 70) for a predetermined period of time, the picnic light 66 may be activated to illuminate the second area 70. It will be understood that both the picnic light 66 and the ground illumination light 64 may be emitted at the same time to illuminate both the first and second areas 68, 70 at the same time.

Figure 3A:
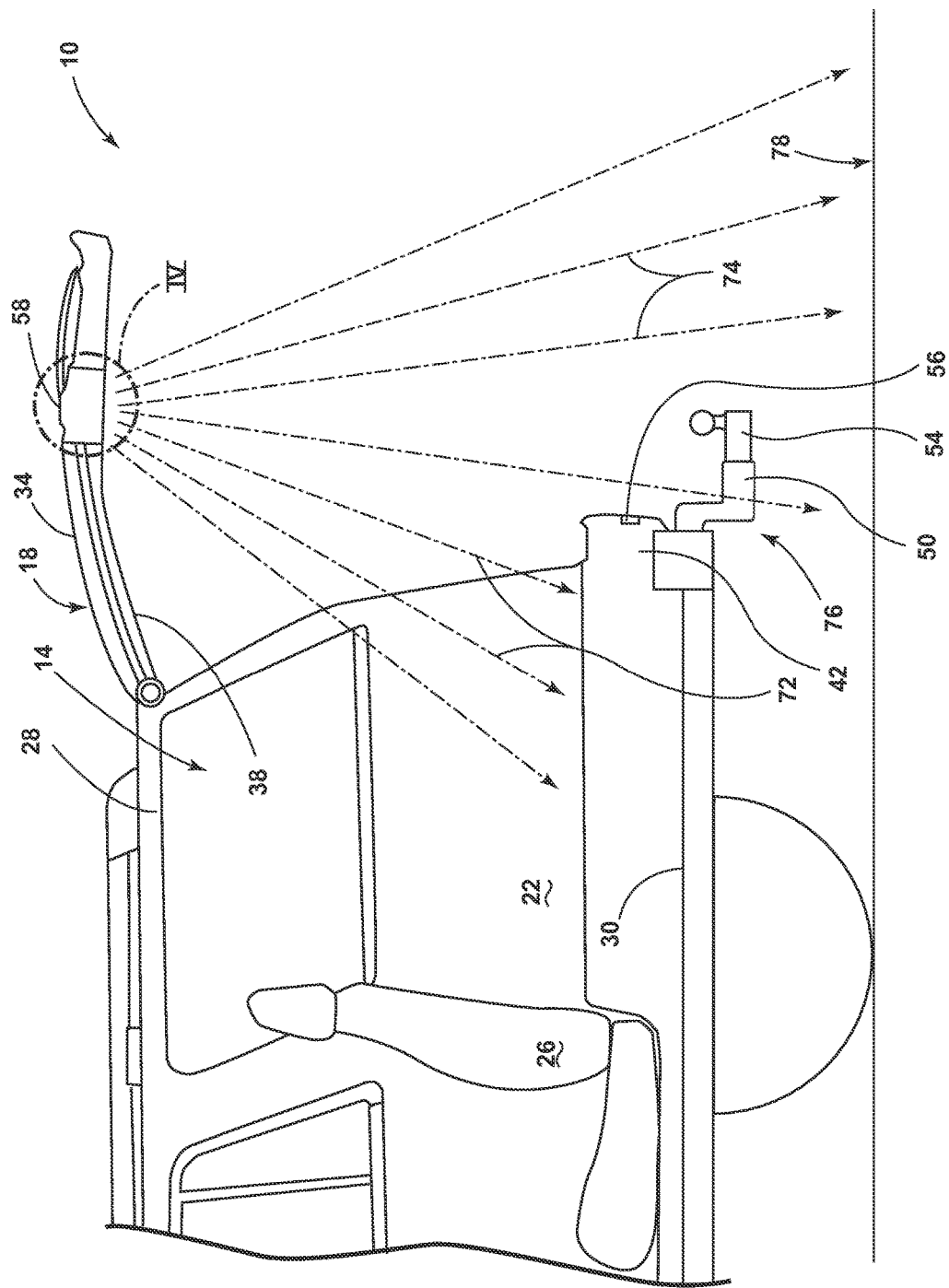
FIG. 3A is a cross-sectional view taken along line IIIA of FIG. 1, according to a further embodiment.
Figure 3B:
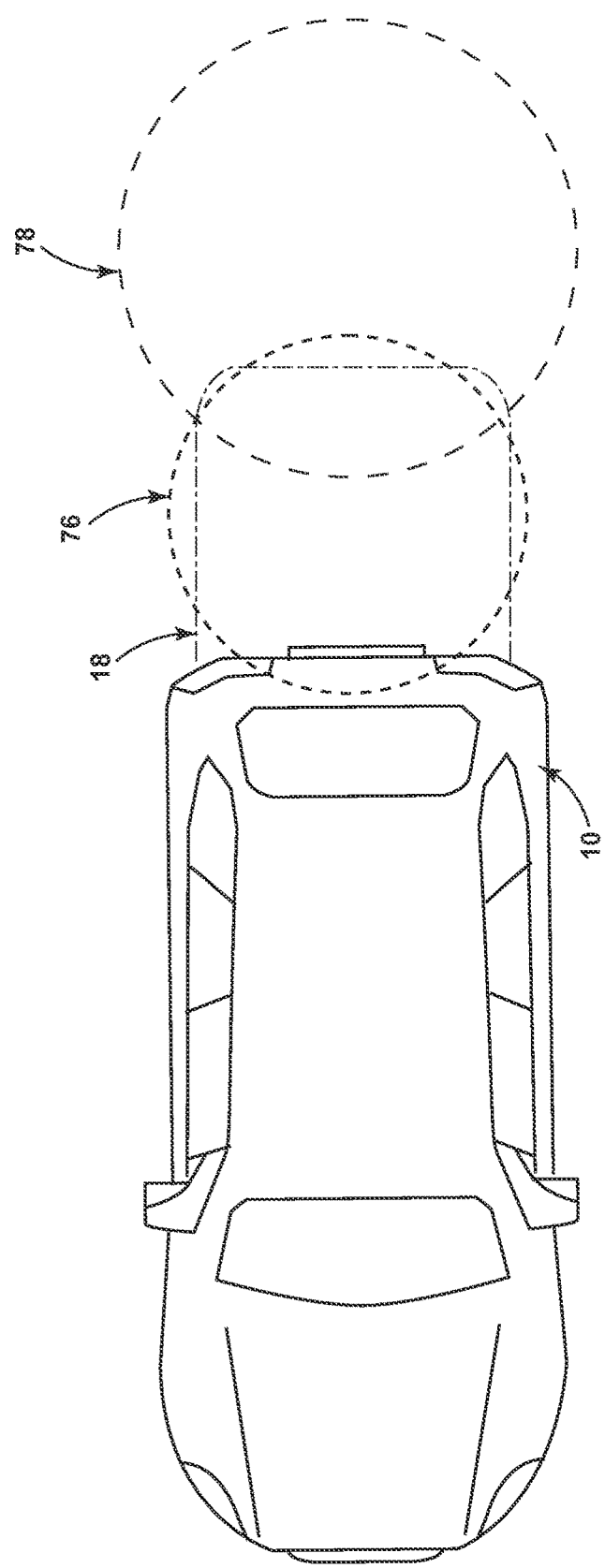
FIG. 3B is a top plan view of the vehicle emitting light, according to one embodiment.

Referring now to FIGS. 3A and 3B, the tailgate 18 is depicted in the substantially open position. The tailgate 18 may pivot about a pair of hinges positioned at the roof 28 of the vehicle 10. As the tailgate 18 rotates from the substantially closed position (FIG. 1) to the substantially open position (FIG. 3A), the illumination system 58 rotates from an approximately vertical orientation to an approximately horizontal orientation. By rotating the tailgate 18 into the substantially horizontal open position, the illumination system 58 is positioned to emit light in a generally downward direction. The illumination system 58 may operate in an interior lighting mode configured to emit interior light 72 and a loading light mode configured to emit loading light 74. In the interior lighting mode, the illumination system 58 emits the interior light 72 downward toward a third area 76 which may cover the interior cargo space 22, the trailer hitch 54 and a portion of the ground (e.g., between about 0.5 meters and about 3 meters from the bumper 48) below or proximate the open tailgate 18. Such illumination of the third area 76 may be advantageous for placing items within the cargo space 22 and/or avoiding accidental collision between a person and the bumper 48 or trailer hitch 54 of the vehicle 10 while loading items into the cargo space 22.

As explained above, the illumination system 58 may also be operated in a loading lighting mode. In the loading lighting mode, the loading light 74 may be directed downward and rearward from the vehicle 10 to illuminate a fourth area 78 of the ground. The elevated location of the illumination system 58 permits a wide angle at which the loading light 74 may be emitted, thus providing a larger fourth area 78 which receives task lighting (e.g., for preparing the loading items into the cargo space 22, staging items for loading, or approaching the cargo space 22). In various embodiments, signals from the proximity sensors 56 may be used in determining whether the interior lighting mode or the loading lighting mode should be activated. For example, if the proximity sensors 56 detect movement greater than about 2 or 3 meters from the bumper 48, the loading lighting mode may be activated and the loading light 74 emitted from the illumination system 58.

Figure 4:
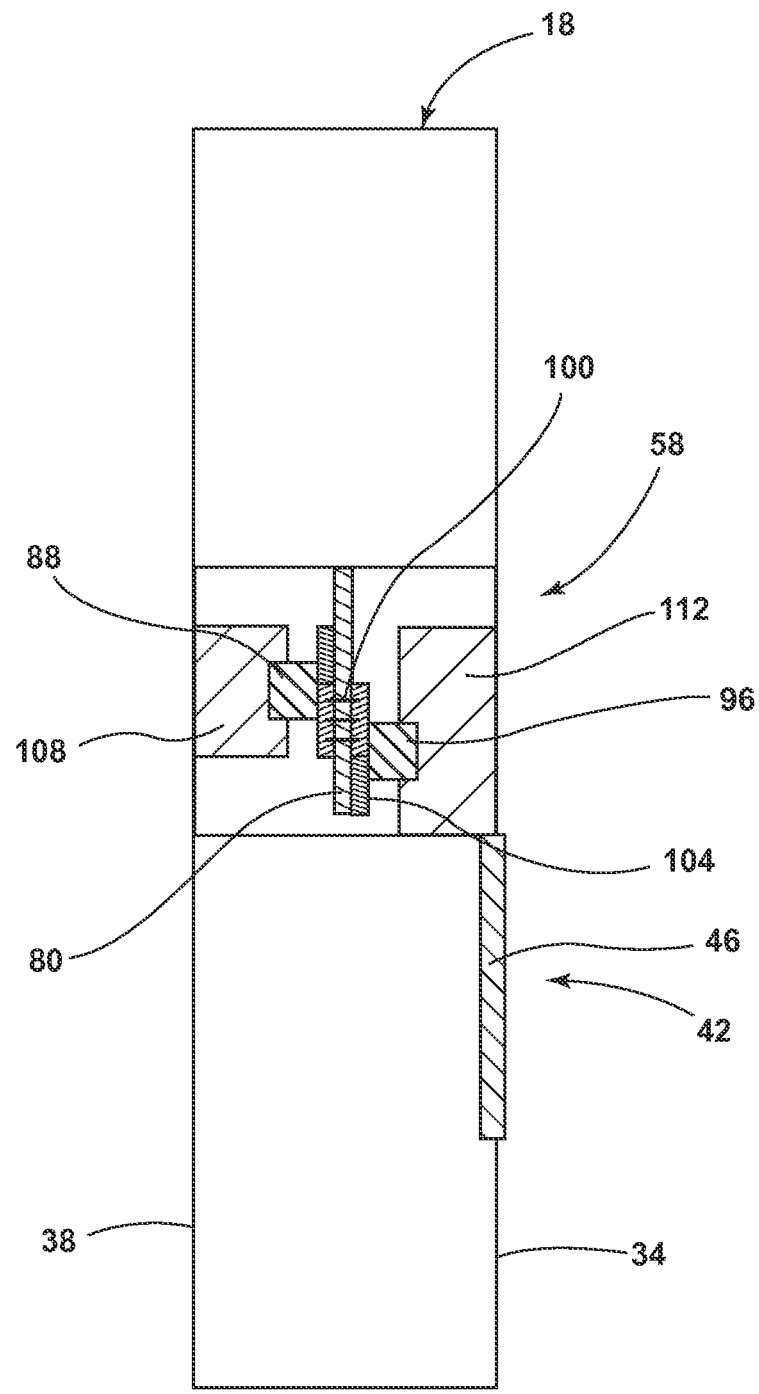
FIG. 4 is an enlarged cross-sectional view taken at IV of FIG. 3A, according to one embodiment.

Referring to FIGS. 4-5B, the illumination system 58 includes a printed circuit board (PCB) 80 having an internal side 84 having a plurality of internal light sources 88 and an external side 92 having a plurality of external light sources 96. Disposed through the PCB 80 are a plurality of thermal vias 100 which thermally couple the internal and external light sources 88, 96 to a heat sink 104. Use of the thermal vias 100 allow various embodiments of the PCB 80 to have only one heat sink 104 which may allow a decrease in complexity and cost of the illumination system 58. An internal optic 108 is positioned on top of the internal light sources 88 to aid in directing the cargo light 62, interior light 72 and loading light 74 as disclosed above. Similarly to the internal optic 108, an external optic 112 is positioned on top of the external light sources 96 and configured to direct the ground illumination light 64 and picnic light 66 as described above. In some embodiments, a backup camera for the vehicle 10 may additionally be attached to the PCB 80. Use of the dual sided PCB 80 may allow for several advantages to be realized. Firstly, the use of a single heat sink 104 may allow for decreased weight and cost of the illumination system 58. Secondly, use of the illumination system 58 may decrease costs associated with assembly and/or manufacture. For example, use of the illumination system 58 may allow a decreased part count and require less manufacturing and installation steps (e.g., reduced to a single installation step) as the PCB 80 may be installed in a single step, but provide illumination both to the cargo space 22 and the exterior of the vehicle 10. Further, as the illumination system 58 may be installed in a single step, costs associated with shipping and storing parts at the manufacturing facility may be decreased.

Referring now to FIG. 5A, the internal light sources 88 include at least one interior lighting source(s) 116, at least one cargo light source 120 and a plurality of loading lighting sources 124. In the depicted embodiment, the PCB 80 has a single cargo lighting source 120, but may have between 2 and 20 sources disposed across the PCB 80 configured to provide more or less cargo light 62 to the cargo space (FIG. 2A) based on design criteria. In the depicted embodiment, the internal light sources 88 may include two (2) or more interior lighting sources 116 configured to be operated when the tailgate 18 is in the open position, as described above. In the depicted embodiment, the internal light sources 88 include six (6) loading lighting sources 124. There may be more loading lighting sources 124 than interior lighting or cargo lighting sources 116, 120 in order to provide a brighter or more intense lighting to a greater area (e.g., the fourth area 78) than the interior lighting sources 116 (e.g., the third area 76).

With reference now to FIG. 5B, the external light sources 96 include both ground illumination light sources 128 and picnic lighting sources 132. In the depicted embodiment, 8 picnic lighting sources 132 are disposed across the PCB 80. The picnic light sources 132 have sufficient power to produce the picnic light 66 and throw it to the second area 70. The ground illumination sources 128 are configured to produce the ground illumination light 64 and may be less numerous and intense than the picnic lighting sources 132, as the first area 68 is more proximate the vehicle 10 than the second area 70.

Figure 6A:
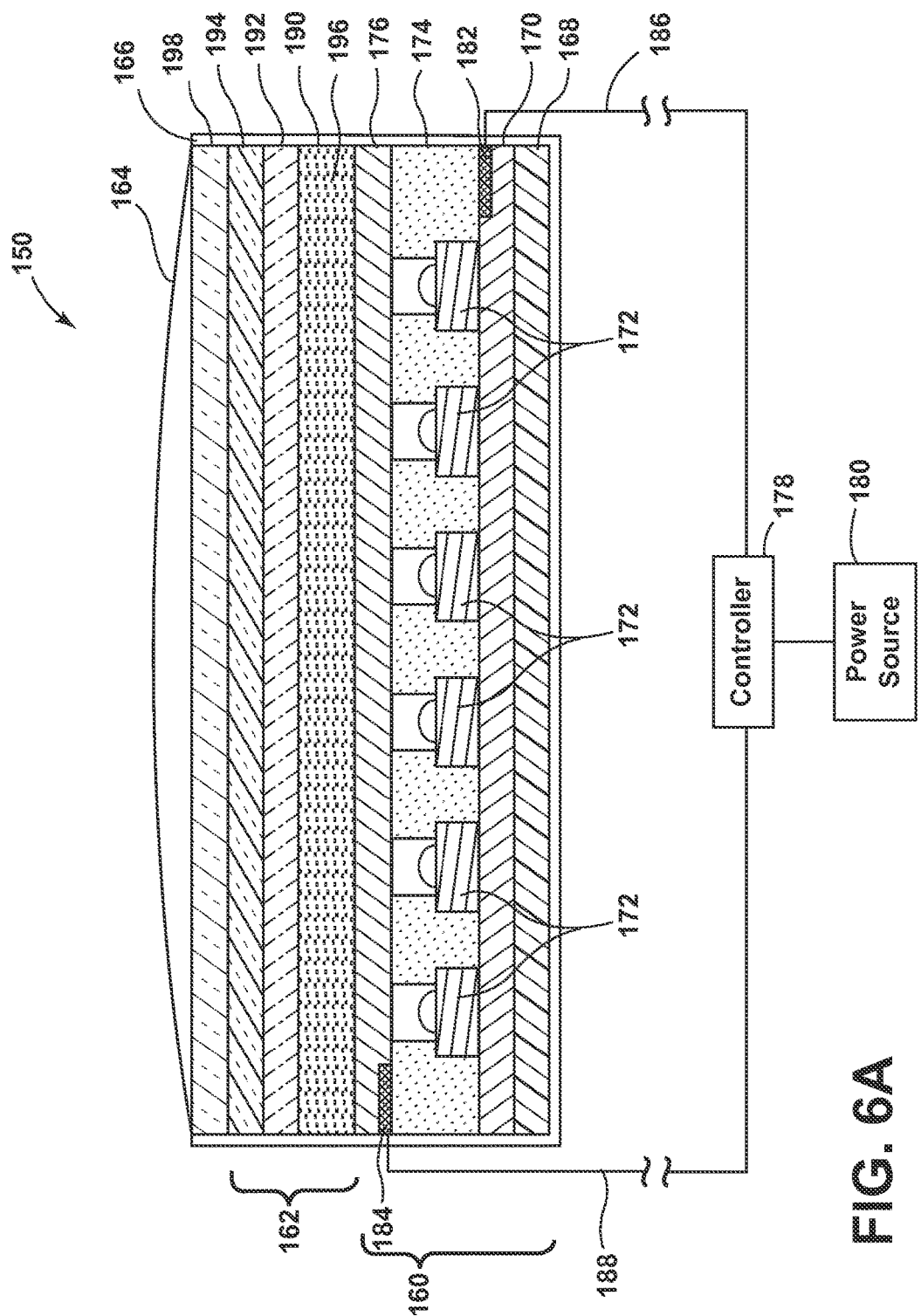
FIG. 6A is a cross-sectional view taken along line VIA of FIG. 5B illustrating a light source, according to one embodiment.

Referring to FIGS. 6A-6E, the internal and external light sources 88, 96 may be light emitting diodes (LEDs), or may be another form of light source. Depicted is a cross-sectional view of a light source 150 capable of use on, or in replacement of, the PCB 80 with an external photoluminescent structure 162, according to one embodiment. As illustrated in FIG. 6A, the light source 150 may have a stacked arrangement that includes a light-producing assembly 160, a photoluminescent structure 162, a viewable portion 164, and an overmold material 166. It should be appreciated that the viewable portion 164 and the overmold material 166 may be two separate components, or may be integrally formed as a single component.

The light-producing assembly 160 may correspond to a thin-film or printed light emitting diode (LED) assembly and includes a base member 168 as its lowermost layer. The base member 168 may include a polycarbonate, poly-methyl methacrylate (PMMA), or polyethylene terephthalate (PET) material, or any other material known in the art, on the order of 0.005 to 0.060 inches thick and is arranged over the intended vehicle 10 surface on which the light source 150 is to be received (e.g., PCB 80). Alternatively, as a cost saving measure, the base member 168 may directly correspond to a preexisting vehicle structure (e.g., PCB 80).

The light-producing assembly 160 includes a positive electrode 170 arranged over the base member 168. The positive electrode 170 includes a conductive epoxy such as, but not limited to, a silver-containing or copper-containing epoxy. The positive electrode 170 is electrically connected to at least a portion of a plurality of LED sources 172 arranged within a semiconductor ink 174 and applied over the positive electrode 170. Likewise, a negative electrode 176 is also electrically connected to at least a portion of the LED sources 172. The negative electrode 176 is arranged over the semiconductor ink 174 and includes a transparent or translucent conductive material such as, but not limited to, indium tin oxide. Additionally, each of the positive and negative electrodes 170, 176 are electrically connected to a controller 178 and a power source 180 via a corresponding bus bar 182, 184 and conductive leads 186, 188. The bus bars 182, 184 may be printed along opposite edges of the positive and negative electrodes 170, 176 and the points of connection between the bus bars 182, 184 and the conductive leads 186, 188 may be at opposite corners of each bus bar 182, 184 to promote uniform current distribution along the bus bars 182, 184. It should be appreciated that in alternate embodiments, the orientation of components within the light-producing assembly 160 may be altered without departing from the concepts of the present disclosure. For example, the negative electrode 176 may be disposed below the semiconductor ink 174 and the positive electrode 170 may be arranged over the aforementioned semiconductor ink 174. Likewise, additional components, such as the bus bars 182, 184 may also be placed in any orientation such that the light-producing assembly 160 may emit inputted light 200 (FIG. 6B) towards a desired location.

The LED sources 172 may be dispersed in a random or controlled fashion within the semiconductor ink 174 and may be configured to emit focused or non-focused light toward the photoluminescent structure 162. The LED sources 172 may correspond to micro-LEDs of gallium nitride elements on the order of about 5 to about 400 microns in size and the semiconductor ink 174 may include various binders and dielectric material including, but not limited to, one or more of gallium, indium, silicon carbide, phosphorous, and/or translucent polymeric binders.

The semiconductor ink 174 can be applied through various printing processes, including ink jet and silk screen processes to selected portion(s) of the positive electrode 170. More specifically, it is envisioned that the LED sources 172 are dispersed within the semiconductor ink 174, and shaped and sized such that a substantial quantity of the LED sources 172 align with the positive and negative electrodes 170, 176 during deposition of the semiconductor ink 174. The portion of the LED sources 172 that ultimately are electrically connected to the positive and negative electrodes 170, 176 may be illuminated by a combination of the bus bars 182, 184, controller 178, power source 180, and conductive leads 186, 188. According to one embodiment, the power source 180 may correspond to a vehicular power source 180 operating at 12 to 16 VDC. Additional information regarding the construction of light-producing assemblies is disclosed in U.S. Patent Publication No. 2014/0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 6A, the photoluminescent structure 162 is arranged over the negative electrode 176 as a coating, layer, film or other suitable deposition. With respect to the presently illustrated embodiment, the photoluminescent structure 162 may be arranged as a multi-layered structure including an energy conversion layer 190, optional stability layer 192, and optional protection layer 194.

The energy conversion layer 190 includes at least one photoluminescent material 196 having energy converting elements with phosphorescent or fluorescent properties. For example, the photoluminescent material 196 may include organic or inorganic fluorescent dyes including rylenes, xanthenes, porphyrins, phthalocyanines. Additionally, or alternatively, the photoluminescent material 196 may include phosphors from the group of Ce-doped garnets such as YAG:Ce. The energy conversion layer 190 may be prepared by dispersing the photoluminescent material 196 in a polymer matrix to form a homogenous mixture using a variety of methods. Such methods may include preparing the energy conversion layer 190 from a formulation in a liquid carrier medium and coating the energy conversion layer 190 to the negative electrode 176 or other desired base member 168. The energy conversion layer 190 may be applied to the negative electrode 176 by painting, screen printing, flexography, spraying, slot coating, dip coating, roller coating, bar coating, and/or any other methods known in the art. Alternatively, the energy conversion layer 190 may be prepared by methods that do not use a liquid carrier medium. For example, the energy conversion layer 190 may be rendered by dispersing the photoluminescent material 196 into a solid state solution (homogenous mixture in a dry state) that may be incorporated in a polymer matrix formed by extrusion, injection seal, compression seal, calendaring, thermoforming, etc.

To protect the photoluminescent material 196 contained within the energy conversion layer 190 from photolytic and thermal degradation, the photoluminescent structure 162 may include the stability layer 192. The stability layer 192 may be configured as a separate layer optically coupled and adhered to the energy conversion layer 190 or otherwise integrated therewith. The photoluminescent structure 162 may also include the protection layer 194 optically coupled and adhered to the stability layer 192 or other layer (e.g., the energy conversion layer 190 in the absence of the stability layer 192) to protect the photoluminescent structure 162 from physical and chemical damage arising from environmental exposure. The stability layer 192 and/or the protection layer 194 may be combined with the energy conversion layer 190 through sequential coating or printing of each layer, sequential lamination or embossing, or any other suitable means. Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

In operation, the photoluminescent material 196 is formulated to become excited upon receiving inputted light 200 (FIG. 6B) of a specific wavelength from at least a portion of the LED sources 172 of the light-producing assembly 160. As a result, the inputted light 200 undergoes an energy conversion process and is re-emitted at a different wavelength. According to one embodiment, the photoluminescent material 196 may be formulated to convert inputted light 200 into a longer wavelength light, otherwise known as down conversion. Alternatively, the photoluminescent material 196 may be formulated to convert inputted light 200 into a shorter wavelength light, otherwise known as up conversion. Under either approach, light converted by the photoluminescent material 196 may be immediately outputted 202 (e.g., the cargo light 62, ground illumination light 64, picnic light 66, interior light 72 and/or loading light 74) (FIG. 6B) from the photoluminescent structure 162 or otherwise used in an energy cascade, wherein the converted light serves as inputted light to excite another formulation of photoluminescent material 196 located within the energy conversion layer 190, whereby the subsequent converted light may then be outputted from the photoluminescent structure 162 or used as inputted light, and so on. With respect to the energy conversion processes described herein, the difference in wavelength between the inputted light 200 and the converted outputted light 202 is known as the Stokes shift and serves as the principle driving mechanism for an energy conversion process corresponding to a change in wavelength of light.

With continued reference to FIG. 6A, the viewable portion 164 is arranged over the photoluminescent structure 162. In some embodiments, the viewable portion 164 may include a plastic, silicon, or urethane material and is molded over the photoluminescent structure 162 and light-producing assembly 160. Preferably, the viewable portion 164 should be at least partially light transmissible. In this manner, the viewable portion 164 will be illuminated by the photoluminescent structure 162 whenever an energy conversion process is underway. Additionally, by over-sealing the viewable portion 164, it may also function to protect the photoluminescent structure 162 and the light-producing assembly 160. The viewable portion 164 may be arranged in a planar shape and/or an arcuate shape to enhance its viewing potential when in a luminescent state. Like the photoluminescent structure 162 and the light-producing assembly 160, the viewable portion 164 may also benefit from a thin design, thereby helping to fit the light source 150 into small package spaces of the vehicle 10.

In some embodiments, a decorative layer 198 may be disposed between the viewable portion 164 and the photoluminescent structure 162. The decorative layer 198 may include a polymeric material, or other suitable material and is configured to control or modify an appearance of the viewable portion 164 of the light source 150. For example, the decorative layer 198 may be configured to confer a reflective appearance to the viewable portion 164 when the viewable portion 164 is in an unilluminated state. In other embodiments, the decorative layer 198 may be tinted any color to complement the vehicle structure on which the light source 150 is to be received. For example, the decorative layer 198 may be similar in color to that of the tailgate 18 so that the illumination system 58 is substantially hidden when in the unilluminated state. Alternatively, the decorative layer 198 may provide indicia and/or an emblem such that the decorative layer 198 and the indicia may be backlit and/or otherwise illuminated by the light-producing assembly 160. In any event, the decorative layer 198 should be at least partially light transmissible such that the photoluminescent structure 162 is not prevented from illuminating the viewable portion 164 whenever an energy conversion process is underway.

The overmold material 166 is disposed around the light-producing assembly 160 and photoluminescent structure 162 and may be formed integrally with the viewable portion 164. The overmold material 166 may protect the light-producing assembly 160 from physical and chemical damage arising from environmental exposure. The overmold material 166 may have viscoelasticity (i.e., having both viscosity and elasticity), a low Young's modulus, and/or a high failure strain compared with other materials so that the overmold material 166 may protect the light-producing assembly 160 when contact is made thereto. For example, the overmold material 166 may protect the light-producing assembly 160 from the damaging vibration that may occur when the tailgate 18, employing the lighting system 10 described herein, is slammed shut.

In some embodiments, the photoluminescent structure 162 may be employed separate and away from the light-producing assembly 160. For example, the photoluminescent structure 162 may be positioned on a vehicle component or surface proximate, but not in physical contact with, the light-producing assembly 160, as will be described in more detail below. It should be understood that in embodiments where the photoluminescent structure 162 is incorporated into distinct components separated from the light source 150, the light source 150 may still have the same or similar structure to the light source 150 described in reference to FIG. 6A.

Figure 6B:
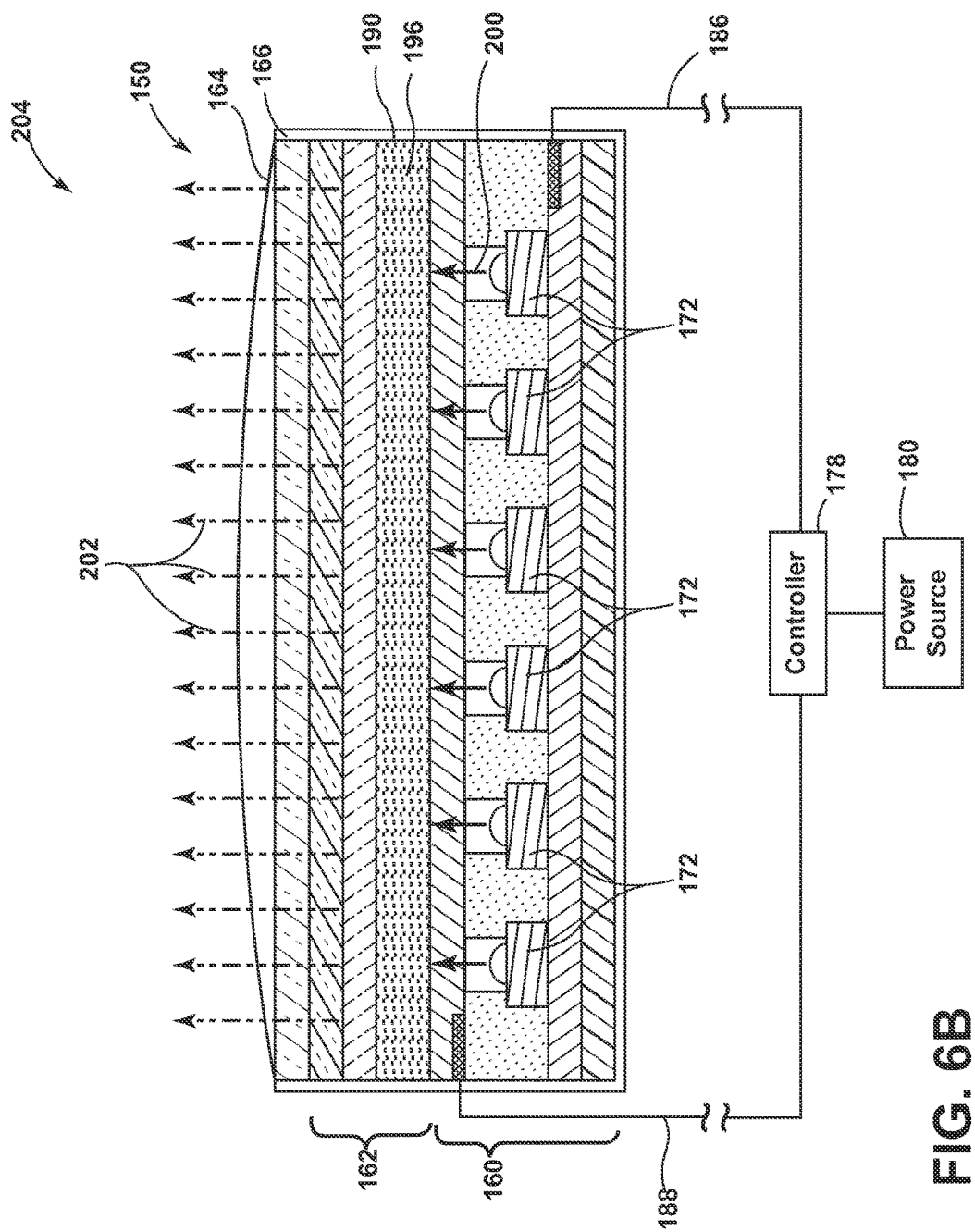
FIG. 6B is a cross-sectional view taken along line VIB of FIG. 5B further illustrating the light source, according to one embodiment.

Referring to FIG. 6B, an energy conversion process 204 for producing single color luminescence is illustrated according to one embodiment. For purposes of illustration, the energy conversion process 204 is described below using the light source 150 depicted in FIG. 6A. In this embodiment, the energy conversion layer 190 of the photoluminescent structure 162 includes a single photoluminescent material 196, which is configured to convert inputted light 200 received from LED sources 172 into the outputted light 202 having a wavelength different than that associated with the inputted light 200. More specifically, the photoluminescent material 196 is formulated to have an absorption spectrum that includes the emission wavelength of the inputted light 200 supplied from the LED sources 172. The photoluminescent material 196 is also formulated to have a Stokes shift resulting in the converted visible outputted light 202 having an emission spectrum expressed in a desired color, which may vary per lighting application. The converted visible outputted light 202 is outputted from the light source 150 via the viewable portion 164, thereby causing the viewable portion 164 to illuminate in the desired color. In one embodiment, the energy conversion process 204 is undertaken by way of down conversion, whereby the inputted light 200 includes light on the lower end of the visibility spectrum such as blue, violet, or ultraviolet (UV) light. Doing so enables blue, violet, or UV LEDs to be used as the LED sources 172, which may offer a relative cost advantage over simply using LEDs of the desired color and foregoing the energy conversion process altogether. Furthermore, the illumination provided by the viewable portion 164 may offer a unique, substantially uniform, and/or attractive viewing experience that may be difficult to duplicate through non-photoluminescent means.

Figure 6C:
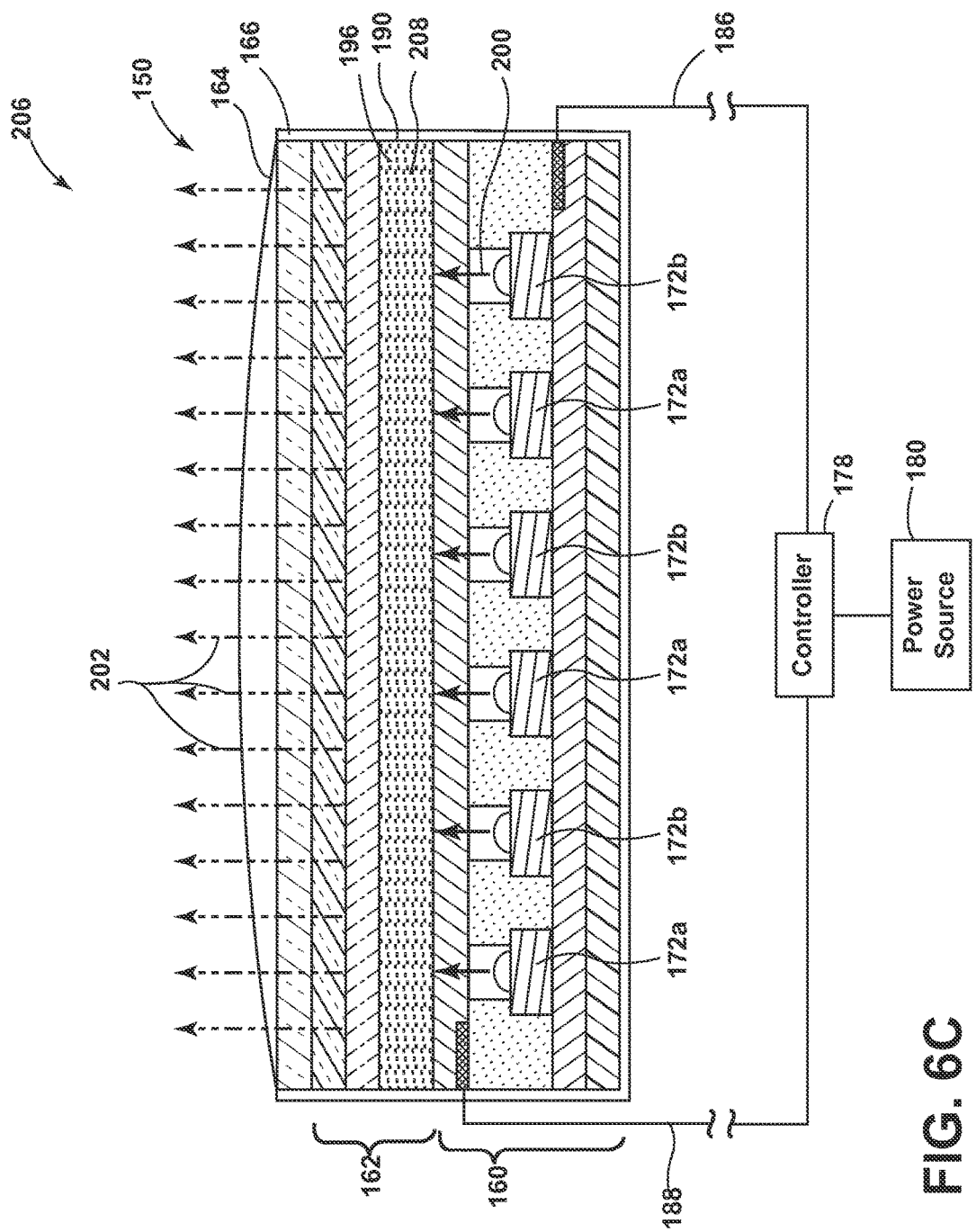
FIG. 6C is a cross-sectional view taken along line VIC of FIG. 5B illustrating an alternate light source, according to one embodiment.

Referring to FIG. 6C, a second energy conversion process 206 for generating multiple colors of light is illustrated, according to one embodiment. For consistency, the second energy conversion process 206 is also described below using the light source 150 depicted in FIG. 6A. In this embodiment, the energy conversion layer 190 includes the first photoluminescent materials 196 and a second photoluminescent material 208 that are interspersed within the energy conversion layer 190. Alternatively, the photoluminescent materials 196, 208 may be isolated from each other if desired. Also, it should be appreciated that the energy conversion layer 190 may include more than two different photoluminescent materials 196, 208, in which case, the concepts provided herein similarly apply. In one embodiment, the second energy conversion process 206 occurs by way of down conversion using blue, violet, and/or UV light as the source of excitation.

With respect to the presently illustrated embodiment, the excitation of photoluminescent materials 196, 208 is mutually exclusive. That is, photoluminescent materials 196, 208 are formulated to have non-overlapping absorption spectrums and Stoke shifts that yield different emission spectrums. Also, in formulating the photoluminescent materials 196, 208, care should be taken in choosing the associated Stoke shifts such that the converted outputted light 202 emitted from one of the photoluminescent materials 196, 208, does not excite the other, unless so desired. According to one exemplary embodiment, a first portion of the LED sources 172, exemplarily shown as LED sources 172a, is configured to emit an inputted light 200 having an emission wavelength that only excites photoluminescent material 196 and results in the inputted light 200 being converted into a visible light outputted 202 of a first color (e.g., white). Likewise, a second portion of the LED sources 172, exemplarily shown as LED sources 172b, is configured to emit an inputted light 200 having an emission wavelength that only excites second photoluminescent material 208 and results in the inputted light 200 being converted into a visible outputted light 202 of a second color (e.g., red). Preferably, the first and second colors are visually distinguishable from one another. In this manner, LED sources 172a and 172b may be selectively activated using the controller 178 to cause the photoluminescent structure 162 to luminesce in a variety of colors. For example, the controller 178 may activate only LED sources 172a to exclusively excite photoluminescent material 196, resulting in the viewable portion 164 illuminating in the first color. Alternatively, the controller 178 may activate only LED sources 172b to exclusively excite the second photoluminescent material 208, resulting in the viewable portion 164 illuminating in the second color.

Alternatively still, the controller 178 may activate LED sources 172a and 172b in concert, which causes both of the photoluminescent materials 196, 208 to become excited, resulting in the viewable portion 164 illuminating in a third color, which is a color mixture of the first and second color (e.g., pinkish). The intensities of the inputted light 200 emitted from each light source 172a, 172d may also be proportionally varied to one another such that additional colors may be obtained. For energy conversion layers 190 containing more than two distinct photoluminescent materials 196, 208, a greater diversity of colors may be achieved. Contemplated colors include red, green, blue, and combinations thereof, including white, all of which may be achieved by selecting the appropriate photoluminescent materials and correctly manipulating their corresponding LED sources 172.

Figure 6D:
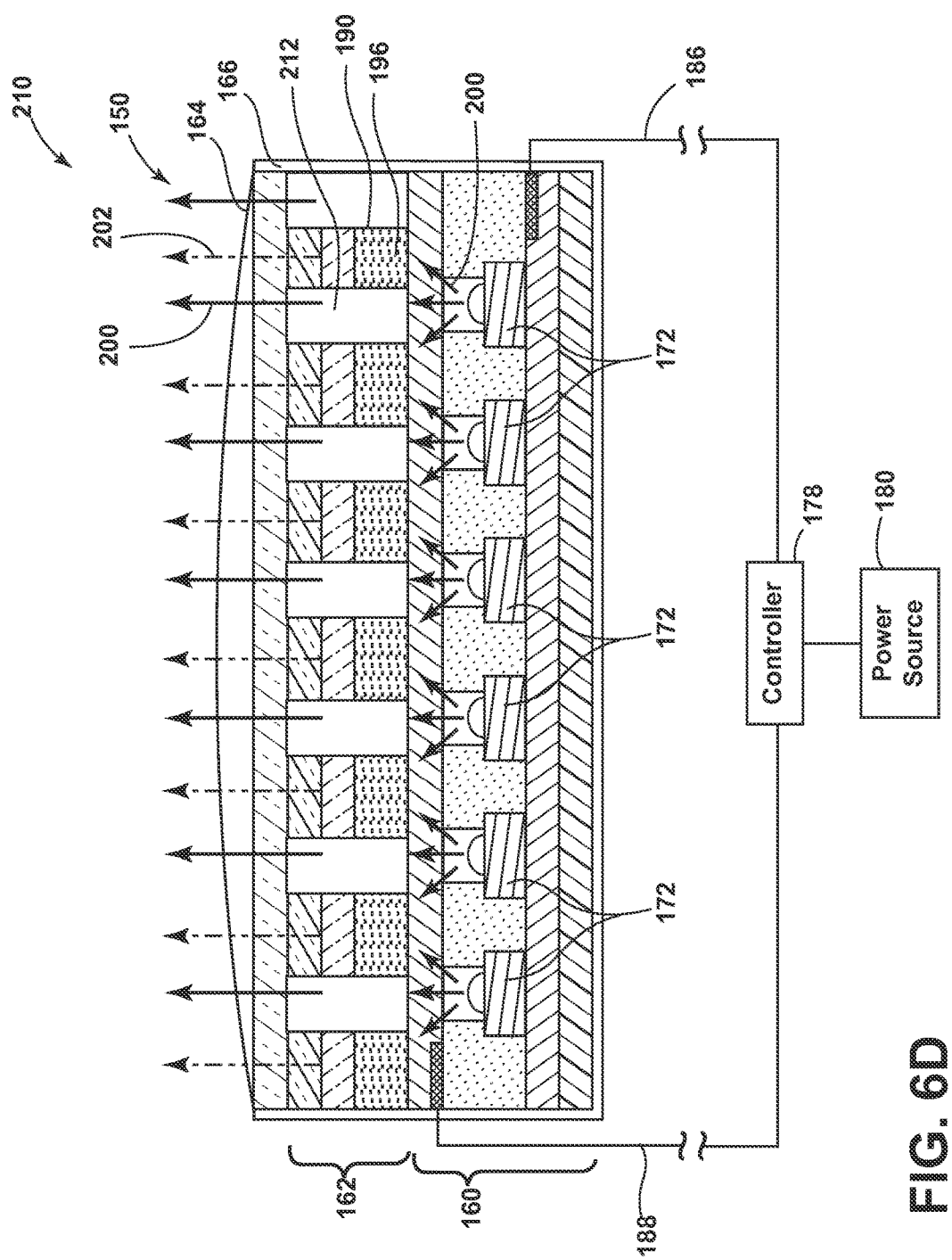
FIG. 6D is a cross-sectional view taken along line VID of FIG. 5B illustrating a light source having a luminescent structure separated by light transmissive portions disposed on the light source, according to one embodiment.

Referring to FIG. 6D, a third energy conversion process 210 includes a light-producing assembly 160, such as the one described in reference to FIG. 6A, and a photoluminescent structure 162 disposed thereon is illustrated, according to an alternate embodiment. The photoluminescent structure 162 is configured to convert inputted light 200 received from LED sources 172 into a visible outputted light 202 having a wavelength different than that associated with the inputted light 200. More specifically, the photoluminescent structure 162 is formulated to have an absorption spectrum that includes the emission wavelength of the inputted light 200 supplied from the LED sources 172. The photoluminescent material 196 is also formulated to have a Stokes shift resulting in the converted visible outputted light 202 having an emission spectrum expressed in a desired color, which may vary per lighting application.

The photoluminescent structure 162 may be applied to only a portion of the light-producing assembly 160, for example, in a stripped manner. Between the photoluminescent structures 162 may be light transmissive portions 212 that allow inputted light 200 emitted from the LED sources 172 to pass therethrough at the first wavelength. The light transmissive portions 212 may be an open space, or may be a transparent or translucent material. The inputted light 200 emitted through the light transmissive portions 212 may be directed from the light-producing assembly 160 towards a second photoluminescent structure disposed proximate to the light-producing assembly 160 which may be configured to luminesce in response to the inputted light 200 that is directed through the light transmissive portions 212.

Figure 6E:
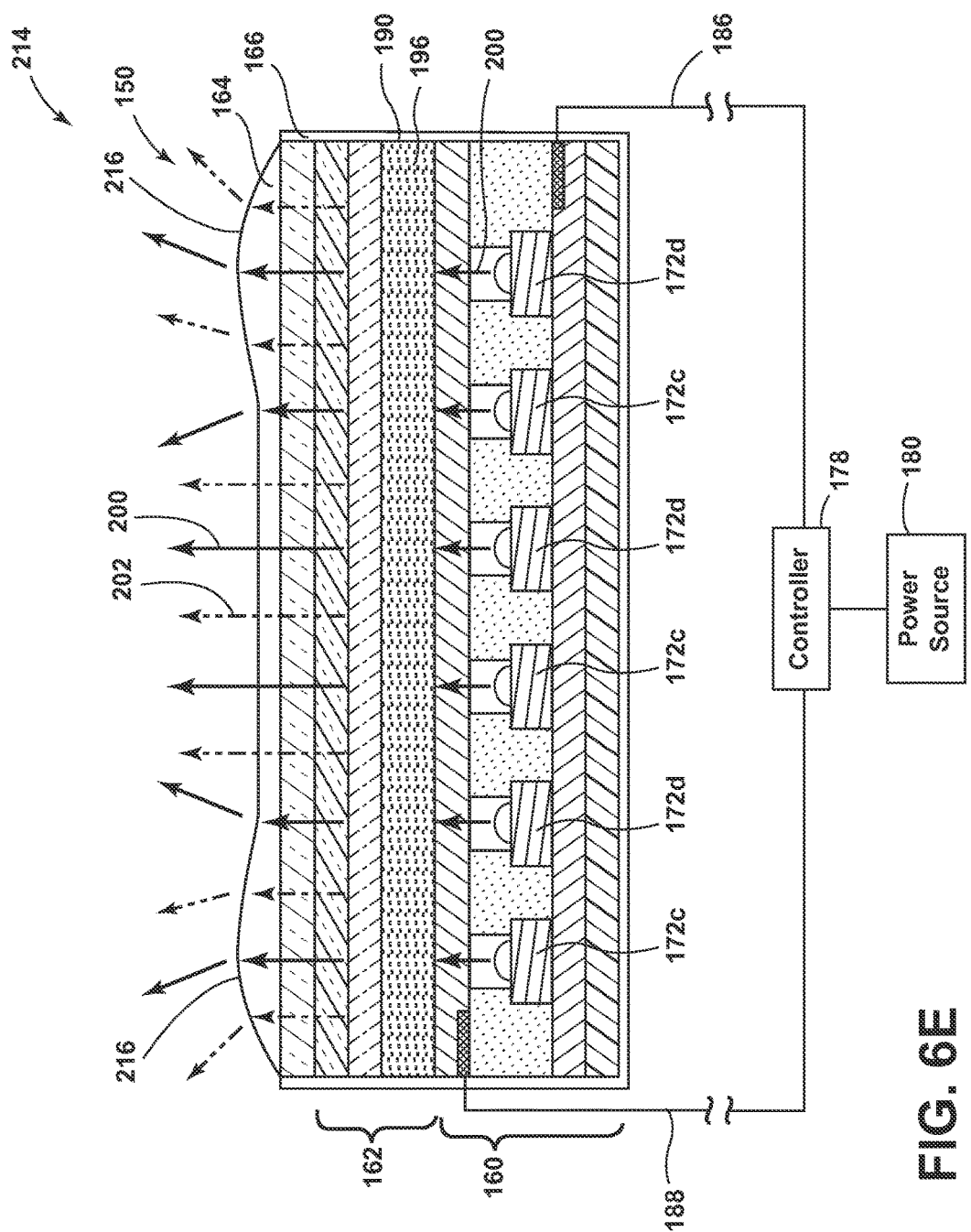
FIG. 6E is a cross-sectional view taken along line VIE of FIG. 5B illustrating an alternate light source having a luminescent structure disposed on the light source configured to convert a portion of light emitted from the light source from a first wavelength to a second wavelength, according to one embodiment.

Referring to FIG. 6E, a fourth energy conversion process 214 for generating multiple colors of light utilizing the light-producing assembly 160, such as the one described in reference to FIG. 6A, and a photoluminescent structure 162 disposed thereon, is illustrated. In this embodiment, the photoluminescent structure 162 is disposed over a top portion of the light-producing assembly 160. The excitation of photoluminescent material 196 is formulated such that a portion of inputted light 200 emitted from the LED sources 172 passes through the photoluminescent structure 162 at the first wavelength (i.e., the inputted light 200 emitted from the light source 150 is not converted by the photoluminescent structure 162). The intensity of the emitted inputted light 200 may be modified by pulse-width modulation, or current control, to vary the amount of inputted light 200 emitted from the LED sources 172 that passes through the photoluminescent structure 162 without converting to a second, outputted light 202 wavelength. For example, if the light source 150 is configured to emit inputted light 200 at a low level, substantially all of the inputted light 200 may be converted to the second wavelength of outputted light 202. In this configuration, a color of outputted light 202 corresponding to the photoluminescent structure 162 may be emitted from the light-producing assembly 160. If the light source 150 is configured to emit inputted light 200 at a high level, only a portion of the first wavelength may be converted by the photoluminescent structure 162. In this configuration, a first portion of the inputted light 200 may be converted by the photoluminescent structure 162 and a second portion of the inputted light 200 may be emitted from the light-producing assembly 160 at the first wavelength towards additional photoluminescent structures disposed proximately to the light source 150. The additional photoluminescent structures may luminesce in response to the inputted light 200 emitted from the light source 150.

According to one exemplary embodiment, a first portion of the LED sources 172, exemplarily shown as LED sources 172a, is configured to emit an inputted light 200 having a wavelength that excites the photoluminescent material 196 within the photoluminescent structure 162 and results in the inputted light 200 being converted into a visible outputted light 202 of a first color (e.g., white). Likewise, a second portion of the LED sources 172, exemplarily shown as LED sources 172c, is configured to emit an inputted light 200 having a wavelength that passes through the photoluminescent structure 162 and excites additional photoluminescent structures disposed proximately to the illumination system 58, thereby illuminating in a second color. The first and second colors may be visually distinguishable from one another. In this manner, LED sources 172c and 172d may be selectively activated using the controller 178 to cause the illumination system 58 to luminesce in a variety of colors.

The light-producing assembly 160 may also include optics 216 (e.g., internal optic 108 or external optic 112) that are configured to direct inputted light 200 emitted from the LED sources 172c, 172d and the outputted light 202 emitted from the photoluminescent structure 162 towards pre-defined locations. For example, the inputted light 200 emitted from the LED sources 172c, 172d and the photoluminescent structure 162 may be directed and/or focused towards a desired feature and/or location proximate to the light source 150.

Figure 7:
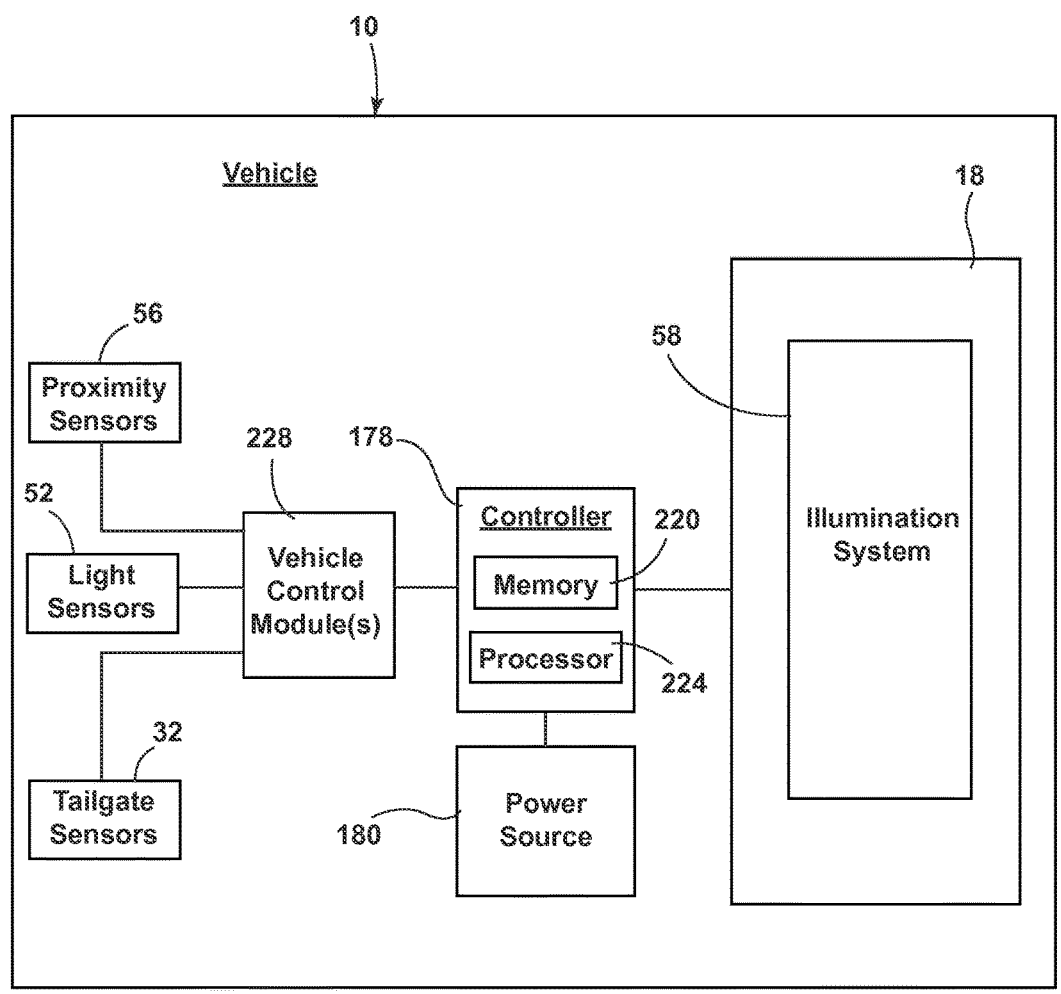
FIG. 7 is a block diagram further illustrating the vehicle and tailgate illumination system.

Referring to FIG. 7, a box diagram of the vehicle 10 is shown in which an illuminated tailgate 18 is implemented. The tailgate 18 includes the controller 178 in communication with the illumination system 58. The controller 178 may include a memory 220 having instructions contained therein that are executed by a processor 224 of the controller 178. The controller 178 may provide electrical power to the illumination system 58 via the power source 180 located onboard the vehicle 10. In addition, the controller 178 may be configured to control the light output of the illumination system 58 based on feedback received from one or more vehicle control modules 228 such as, but not limited to, a body control module, engine control module, steering control module, brake control module, the like or a combination thereof. The vehicle control modules 228 may be in communication and configured to receive signals from the proximity sensors 56, the light sensors 52 and/or the tailgate sensor 32.

By controlling the light output of the illumination system 58, the tailgate 18 may illuminate in a variety of colors and/or patterns to provide an aesthetic appearance, task lighting, or may provide vehicle information to an intended observer. For example, described below is a plurality of exemplary lighting actions that may be taken by the illumination system 58. In a first example, when the vehicle 10 senses that a dash switch (e.g., lighting switch or otherwise) is on and the tailgate 18 is closed (e.g., via tailgate sensor 32), the illumination system 58 may emit the picnic light 66 at full intensity to illuminate the second area 70. In a second example, when movement is detected behind the vehicle 10 (e.g., via the proximity sensors 56) for about 3 or more seconds, and the light sensor 52 detects low lighting conditions (e.g., no light or twilight because of night, sunset or sunrise), the illumination system 58 may emit the ground illumination light 64 at 25% intensity to illuminate the first area 68 and provide lighting to a person working or crossing behind the vehicle 10. In a third example, if movement is detected behind the vehicle 10 closer than about 2.7 meters for greater than about 15 seconds, and the light sensor 56 detects low lighting conditions, the ground illumination light 64 may be ramped to 100% intensity. If movement is not detected after about 30 seconds, the emission of ground illumination light 64 may be halted. In a fourth example, if a person opens the tailgate 18 while the light sensor 56 determines that there are low light conditions and movement is sensed, the illumination system 58 may wait about 3 seconds and then ramp the emission of interior light 72 and loading light 74 to 100%. In a fifth example, if the tailgate 18 is sensed as open, but no movement is detected, the illumination system 58 may be shut off if it was automatically turned on. In a sixth example, regardless of whether the tailgate 18 is in the open or closed position, if the light sensor 52 detects low lighting conditions while there is no movement senses (e.g., via the proximity sensors 56) within about 2 meters of the vehicle 10, but there is movement sensed greater than about 2 meters from the vehicle 10, ground illumination light 64 or interior light 72 (if present) may be terminated and picnic light 66 or loading light 74 (depending on the orientation of the tailgate 18) may be emitted at 100% intensity. In a seventh example, if the vehicle 10 is sensed to be in a reverse gear (e.g., through a transmission switch or the like) the illumination system 58 may emit the picnic light 66 at 100% intensity to aid in reversing the vehicle 10.

It is also important to note that the construction and arrangement of the elements of the disclosure, as shown in the exemplary embodiments, are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments, without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and, further, it is to be understood that such concepts are intended to be covered by the following claims unless these claims by their language expressly state otherwise.

What is claimed is:

1. A vehicle comprising:
   a cabin defining a cargo space;
   a tailgate operable between a substantially open position and a substantially closed position, the tailgate defining a license plate area on an exterior surface thereof; and
   an illumination system in electrical communication with a proximity sensor positioned within the tailgate such that the illumination system independently illuminates one of the cargo space and the license plate area when the tailgate is in the closed position and illuminates a ground area behind the vehicle when the tailgate is in the open position.

2. The vehicle of claim 1, wherein the illumination system comprises at least one light source on each of an interior side of a printed circuit board and an exterior side of the printed circuit board.

3. The vehicle of claim 2, wherein the light sources share a common heat sink.

4. The vehicle of claim 1, wherein the illumination system is configured to change between illumination modes based at least in part on an electrical signal from the proximity sensor.

5. The vehicle of claim 1, wherein the illumination system is configured to operate in at least two different modes while the tailgate is in the closed position and is configured to operate in at least two different modes while the tailgate is in the open position.

6. A vehicle, comprising:
   a vehicle cabin defining a cargo space;
   a tailgate pivotally coupled to the vehicle, the tailgate defining an exterior surface and an interior surface; and
   an illumination system in electrical communication with a proximity sensor comprising a light source on an interior and an exterior side of a printed circuit board, the illumination system disposed through the tailgate and configured to emit light from at least one of the exterior surface and the interior surface of the tailgate.

7. The vehicle of claim 6, wherein the light sources share a common heat sink.

8. The vehicle of claim 6, wherein the illumination system is configured to illuminate an area further than about 3 meters behind the vehicle.

9. The vehicle of claim 6, wherein the illumination system is configured to independently illuminate the cargo space and a license plate area.

10. The vehicle of claim 6, wherein the illumination system comprises at least one photoluminescent portion.

11. The vehicle of claim 10, wherein the light source also comprises a printed light emitting diode assembly.

12. A vehicle, comprising:
a vehicle cabin defining a cargo space;
a tailgate pivotally coupled to the vehicle, the tailgate defining an exterior surface and an interior surface; and
an illumination system positioned within the tailgate comprising a pair of light sources on respective inboard and outboard surfaces of a printed circuit board, the illumination system configured to switch between different illumination modes based at least in part on a signal from a proximity sensor.

13. The vehicle of claim 12, wherein the different illumination modes of the illumination system are configured to illuminate different distances behind the vehicle.

14. The vehicle of claim 13, wherein at least one of the illumination modes of the illumination system is configured to illuminate an area further than about 2 meters behind the vehicle.

15. The vehicle of claim 12, wherein the light sources share a common heat sink.

* * * * *